(12) United States Patent
Wells (10) Patent No.: US 12,430,953 B2
(45) Date of Patent: Sep. 30, 2025

(54) MULTIPARK VALET PARKING APPLICATION

(71) Applicant: Marcus Wells, Arlington, TX (US)

(72) Inventor: Marcus Wells, Arlington, TX (US)

( * ) Notice: Subject to any disclaimer, the term of this patent is extended or adjusted under 35 U.S.C. 154(b) by 397 days.

(21) Appl. No.: 18/094,938

(22) Filed: Jan. 9, 2023

(65) Prior Publication Data
US 2023/0162535 A1 May 25, 2023

Related U.S. Application Data (63) Continuation-in-part of application No. 16/813,312, filed on Mar. 9, 2020, now abandoned.

(51) Int. Cl.
| | |
|---|---|
| *H04W 4/40* | (2018.01) |
| *G01S 13/88* | (2006.01) |
| *G06K 7/14* | (2006.01) |
| *G06Q 10/02* | (2012.01) |
| *G06Q 10/20* | (2023.01) |
| *G06Q 20/08* | (2012.01) |
| *G06Q 20/32* | (2012.01) |
| *G06Q 30/0645* | (2023.01) |
| *G07B 15/02* | (2011.01) |

(52) U.S. Cl.
CPC .............. *G07B 15/02* (2013.01); *G01S 13/88* (2013.01); *G06K 7/1417* (2013.01); *G06Q 10/02* (2013.01); *G06Q 10/20* (2013.01); *G06Q 20/0855* (2013.01); *G06Q 20/3224* (2013.01); *G06Q 30/0645* (2013.01); *H04W 4/40* (2018.02); *G06Q 2240/00* (2013.01)

(58) Field of Classification Search
CPC .......... G07B 15/02; H04W 4/40; G01S 13/88; G06K 7/1417; G06Q 10/02; G06Q 10/20; G06Q 20/0855; G06Q 20/3224; G06Q 30/0645; G06Q 2240/00
USPC ......................................................... 455/41.2
See application file for complete search history.

(56) References Cited

U.S. PATENT DOCUMENTS

| | | | |
|---|---|---|---|
| 6,594,579 B1 * | 7/2003 | Lowrey ..................... | G08G 1/20 340/439 |
| 6,879,894 B1 * | 4/2005 | Lightner ................. | G07C 5/008 701/31.4 |
| 9,135,580 B1 * | 9/2015 | Lyman .................... | G06Q 50/40 |
| 2002/0133273 A1 * | 9/2002 | Lowrey ................. | G01M 15/04 340/438 |

(Continued)

*Primary Examiner* — April G Gonzales
(74) *Attorney, Agent, or Firm* — Lyman Moulton, Esq.; Moulton Patents, PLLC (57) ABSTRACT

The disclosure includes a front, back and lateral RF decals and an electronic state machine decal which are triggered by an encoded cell phone signal to verify and track a vehicle for a valet service, comprising negotiating a drop-off and a pickup of the vehicle from a selected valet provider, reserving a valet parking of the vehicle via the selected valet provider, transacting a fee for the valet parking paid from a user to the valet provider and determining associated services for the vehicle while parked. Furthermore, determining associated services for the vehicle while parked further includes renting the vehicle to a third party for a time the vehicle is to be parked, washing or detailing the vehicle and performing mechanical and other repairs are included. Yet picking up the vehicle from a third party vehicle renter is disclosed.

12 Claims, 8 Drawing Sheets

(56) References Cited

U.S. PATENT DOCUMENTS

| | | | | |
|---|---|---|---|---|
| 2002/0173885 | A1* | 11/2002 | Lowrey | G07C 5/008 |
| | | | | 701/31.4 |
| 2003/0046146 | A1* | 3/2003 | Westerman | G06Q 30/02 |
| | | | | 705/14.23 |
| 2012/0130891 | A1* | 5/2012 | Bogaard | B60L 53/60 |
| | | | | 705/40 |
| 2013/0066667 | A1* | 3/2013 | Gulec | G06Q 10/06 |
| | | | | 705/7.13 |
| 2014/0162598 | A1* | 6/2014 | Villa-Real | G07F 7/0886 |
| | | | | 455/411 |
| 2014/0277906 | A1* | 9/2014 | Lowrey | G07C 5/008 |
| | | | | 701/31.4 |
| 2015/0371153 | A1* | 12/2015 | Lohmeier | G06Q 40/08 |
| | | | | 705/5 |
| 2016/0012445 | A1* | 1/2016 | Villa-Real | G06Q 20/4016 |
| | | | | 705/44 |
| 2016/0078689 | A1* | 3/2016 | Cheng | G06Q 50/40 |
| | | | | 705/13 |
| 2017/0191848 | A1* | 7/2017 | Jones | G01C 21/3484 |
| 2017/0349402 | A1* | 12/2017 | Chapman | H04W 4/021 |
| 2018/0182200 | A1* | 6/2018 | Gebremeskel | H04W 4/24 |
| 2019/0035274 | A1* | 1/2019 | Sabagh | G06Q 20/24 |
| 2019/0349349 | A1* | 11/2019 | Layouni | H04L 63/083 |
| 2020/0234380 | A1* | 7/2020 | Dulori | G06Q 30/0283 |
| 2020/0242924 | A1* | 7/2020 | Publicover | G08G 1/087 |

* cited by examiner

MULTIPARK VALET PARKING APPLICATION

CROSS REFERENCE TO UTILITY

This application is a Continuation in Part of and claims priority to the Utility patent application Ser. No. 16/813,312 titled, 'Multipark Valet Parking Application,' filed Mar. 9, 2020 by Marcus Wells referenced herein in its entirety.

BACKGROUND OF THE INVENTION

Using valet parking services can be a lifesaver when in a rush to attend a special affair or simply to have a fun night out. Valet parking services relieve the stress of finding available parking in exchange for a fee.

Throughout the description, same and similar reference numbers may be used to identify same and similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Throughout the present disclosure, the term 'state machine' refers to combinatorial electronic circuits which together create a sequence of conditions to create an electronic output. In the present disclosure, if at least two of the RF decals on a vehicle are triggered by an encoded cell phone signal, the vehicle is positively identified for verification and tracking by the disclosed system. Therefore, the state machine is a simple 4 input NAND gate followed by an inverter combinatorial circuit and receiver transmitter, aka transceiver circuit for electronic handshaking with a cell phone encoded electromagnetic signal. The term 'valet parking,' refers not only to automobile parking but also to boat parking and vessel parking as well. Similarly, the term 'car,' and 'vehicle,' and 'automobile,' are used synonymously throughout the present disclosure. Terms associated therewith including 'mechanical repair, wash/detail, parking space, drop off and pickup,' refer to boats, cars, automobiles, vehicles, vessels, trucks, planes and indeed any conveyance for a person or a living thing that is autonomously, automatically and manually controlled for operation, maintenance and temporary and long term storage. The term 'trigger' is an electronic circuit response of the RF decals to an encoded signal from a cell phone per the details of the present disclosure.

Figure 1:
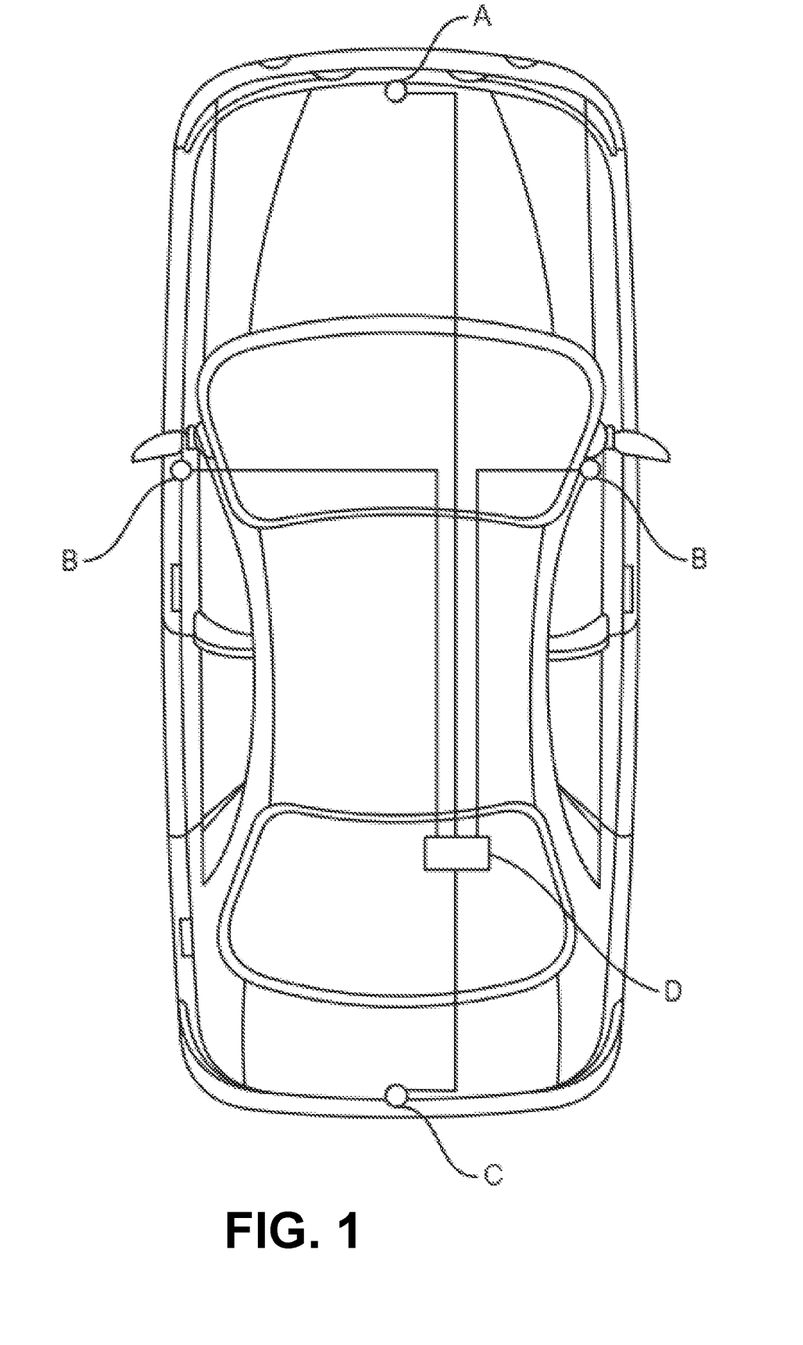
FIG. 1 depicts the placement of RF (radio frequency) decals and state machine decal on the vehicle in accordance with an embodiment of the present disclosure.

FIG. 1 depicts the location of RF (radio frequency) decals and state machine decal on the vehicle in accordance with an embodiment of the present disclosure. The decals include a chip for a respective function of radio frequency identification and for a state machine electronics. The front RF decal A is placed near the radiator grille. Two side RF decals B are placed on each side view mirror, on the side facing out. The state machine is an electronic circuit on the decal D which electronically processes identification from the RF decals A, B and C. The rear RF decal C is located on the back of the vehicle, on the tailgate handle or the trunk, facing out.

Figure 2:
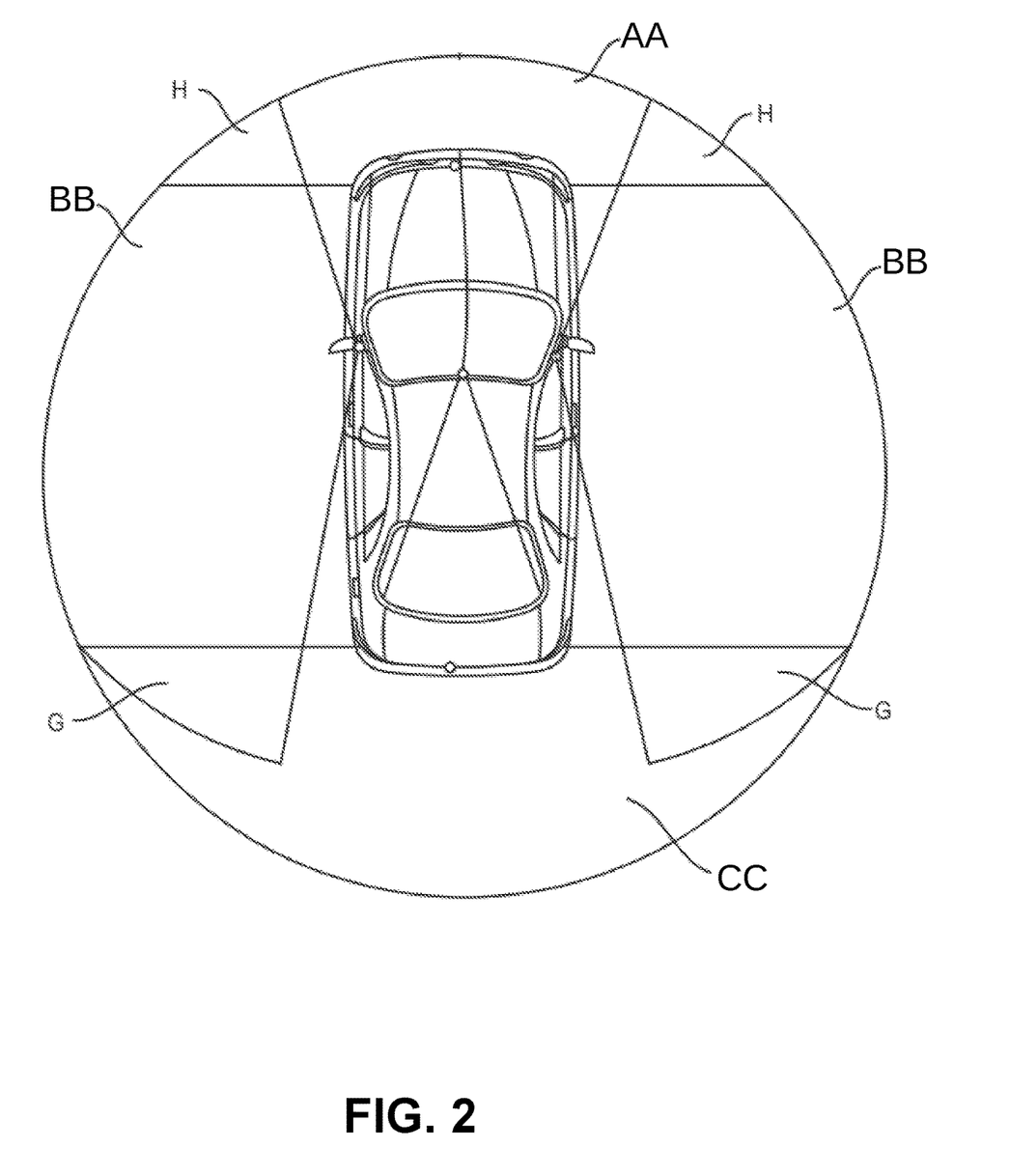
FIG. 2 depicts the range of the RF decals from a bird's eye view of the vehicle in accordance with an embodiment of the present disclosure.

FIG. 2 depicts the range of the RF (radio frequency) decals on the vehicle in accordance with an embodiment of the present disclosure. The front RF decal shows a 180 degree view AA of a front of the vehicle RF trigger by a cell phone encoded signal. The rear view camera shows a 180 degree view CC of a behind the vehicle RF trigger by the cell phone encoded signal. The side view cameras show a range BB between what is triggered by the front and back cameras RF decals. There are minimal blind spots created by the interaction of the RF identification signals from the RF decals, such as by the front sides of the vehicle between the headlights and the side view mirror on both sides, and the back sides of the vehicle between the back door and the trunk on both sides. There are overlapping RF areas as well, with the front and the side overlap H, and the back and the side RF signal overlap areas G.

Based on a trigger of at least two of the RF decals on the vehicle by an encoded cell phone signal, the vehicle is positively identified for verification and tracking by the disclosed system. Therefore, one embodiment of the state machine is a simple 4 input NAND gate followed by an inverter combinatorial circuit and receiver transmitter, aka transceiver circuit for electronic handshaking with a cell phone encoded electromagnetic signal.

The vehicle also has a specific QR (quick response) code sticker on the rear of the car back windshield that can be scanned with a mobile phone or police scanner to identify who the owner of the car is as well as their potential medical warnings to the Police Officer. i.e. Arthritis, PTSD, Deaf, or other handicap or any other medical conditions which could cause the driver to have difficulties to keep their hands on the steering wheel or proclivity to sudden movements or stress.

The disclosure operates by direct current vehicle battery power or by solar panel and device power. This device also has a panic key remote. The panic key remote will call first responders when activated.

Figure 3:
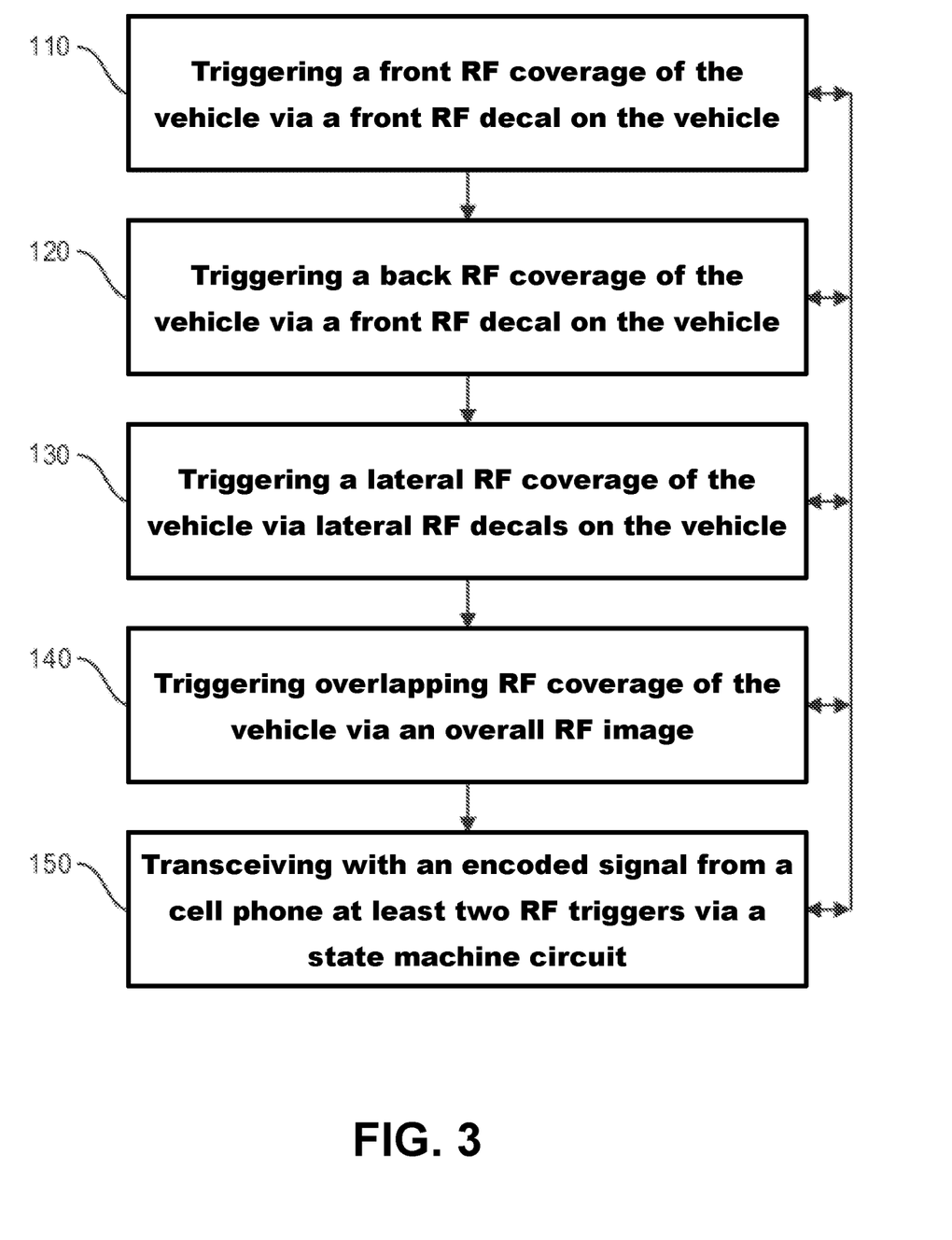
FIG. 3 depicts a first flow chart of state machine states for vehicle verification and tracking in accordance to an embodiment of the present disclosure.

FIG. 3 depicts a first flow chart of state machine states for vehicle verification and tracking in accordance to an embodiment of the present disclosure. The state machine states include 110 processing a front part of a 360 degree overall RF coverage of the vehicle via a plurality of front RF decals disposed on a front of the vehicle. The state machine states also include 120 processing a back part of the 360 degree overall RF image of the vehicle via a back RF decal disposed on a back of the vehicle. The state machine states additionally include 130 processing a lateral part of an overall RF image of the vehicle via a lateral RF decal disposed laterally on the vehicle. The state machine states further include processing an overall RF image 140 including the front, back and lateral image parts into one 360 degree overall image with overlapping RF areas images via a digital electronic state machine. Embodiments of the method include 150 transceiving with an encoded signal from a cell phone of at least two RF decal triggers for a verification and tracking of the vehicle.

The multipark valet parking system includes verification and tracking via a smart decal attached to all cars using the disclosed system and a tracking and payment protocol for the cars/vehicles using imaging technology on a cell phone as it moves from parking to rental to service, etc.

The disclosed mobile system is an online platform where a user searches for nearby valet providers and sends a request to park a car. From another screen of the mobile system, a valet provider accepts the request and allows the user to park his or her vehicle. Accepting and rejecting any request is managed through a unique code assigned at time of using the mobile application. Payment for each booking or use is also managed through Google Pay® or Apple Pay®. The user and the valet provider is given an option to purchase a subscription plan to become a premium member and have access to other services associated with the vehicle such as and including car washing, car detailing, car repair, and car rental to other users.

Based on a user's location, a user is able to view available parking spaces on a map. Upon tapping any valet provider, the application shows parking services, price and distance from the user's location. Upon tapping a button associated with any of the above, the user books a parking space and associated services.

Valet space providers submit an initial application which an administrator of the disclosed mobile app then approves for participation. The valet provider accepts or rejects a user's booking request and submits a price or fee amount to the user for contract. A user logging into the disclosed mobile app for the first time will be showed valet providers in his or her zipcode. The user gives permission to the app to disclose his or her location for the application to further disclose valet parking providers.

An extend booking and a delayed booking features are available to the user to modify the terms of his or her agreement with the valet provider. Users are also given an opportunity to rate and rank a valet provider. A user account is created wherein a summary of past transactions, present transactions and even future transactions are provided in the mobile application.

The main purpose of MultiPark is to present an app (application) that facilitates a smoother and simpler valet and parking experience for guests when attending events. With the advancement of technology, there are a few parking and ride-sharing services apps on the market. However, there is still room for improvements to perfect valet services and customer satisfaction. Once downloaded and connected via a wireless technology such as Bluetooth, MultiPark resolves the issue of guests waiting for the valet to park or retrieve their vehicle before and after participating in festivities or when they are in a hurry to depart. The app can also locate available spots in parking garages for those who choose to self-park and pay within the app.

MultiPark's core features include a vast selection of restaurants, hotels and other hospitality establishments along with parking companies to assist with requests for valet services. Once the guest selects the business or parking facility and scans its assigned code through MultiPark, the valet will be alerted to get that specific vehicle and/or complete other requested services that are also offered at the establishment through the reservation.

For example: From their phone, a guest can send the request for operations to drop the car off before arriving. Valet will have everything prepared once the guest has arrived at the drop location and can hand the keys over to the representative and complete the drop off process in the application. When ready to leave, guests can simply send a notification to the valet operator to prepare the vehicle car ahead of time and send a reply with the estimated time until the car has arrived at the pick-up location. A reservation number will be assigned through the app and features capabilities such as being able to locate a space in a packed/popular lot (for parking lots and garages that do not offer valet services), parking at airports (alert valet before flight arrival) and can request a valet person to retrieve rental cars, instead of having to go to the rental counter.

MultiPark is a stand-alone app that can exist on other applications such as hotel booking apps, airline apps, restaurants apps and more and includes a multifactor authentication (face and finger recognition) to unlock the app before committing to services for additional security measures. MultiPark requires GPS location services for valet drop off and pick up locations, is available on App Store and Play Store for all smart device carriers and supports PCI, Apple Pay and can store cash in the app.

The disclosed MultiPark is the only mobile application of its kind that challenges and advances the process of using valet services. MultiPark is uniquely designed with different user roles, meaning there is a different portal view and permitted functions for the guest, valet, and administrator. MultiPark can be an essential app component for businesses that provide valet attendants in places such as hotels, rental companies, high-scale restaurants, high-security buildings, and airports The application will work just like the alarm application to alert the valet person and request other services such as a car wash, car detailing etc if available through the host facility. Options include sending a request to operations to drop a car off before arriving. Operations will be prepared once a driver arrives at the drop location. A driver hands keys over to a Representative and completes an electronic drop off application. When ready to pick up, the driver sends a notification to a valet person (operator) to prepare the car. The operator will reply with an estimated time for completion of the car wash and pick up. A reservation number and billing will be automatically handled and recorded per the reservation number.

Figure 4:
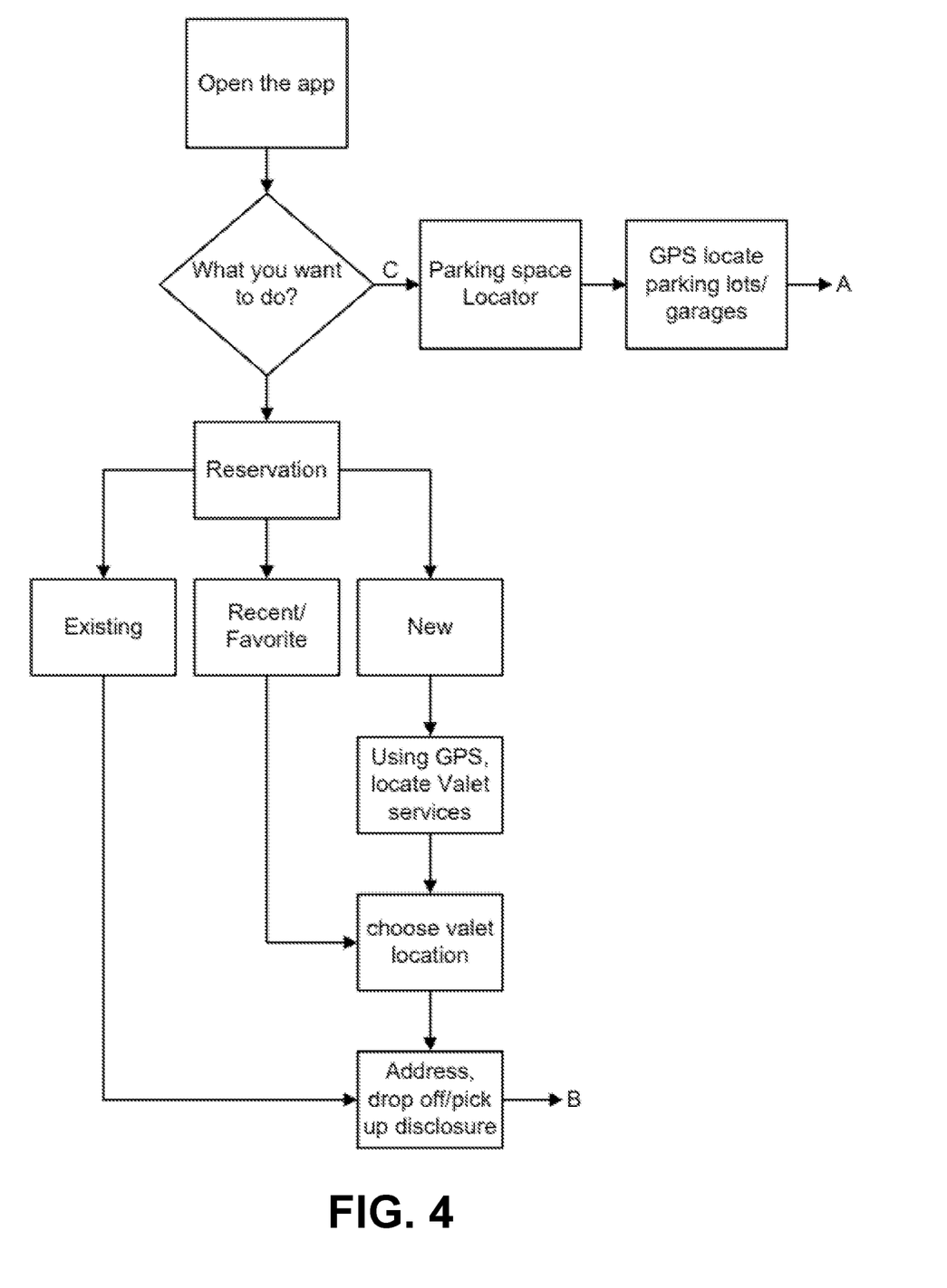
FIG. 4 depicts a second flow chart of state machine states of the multipark valet parking system accordance with the present invention.

FIG. 4 depicts a second flow chart of state machine states of the multipark valet parking system in accordance with the present invention. The user is queried and either a parking space is located with GPS (Global Positioning Satellite) or a reservation is handled as existing, new or favorite. If new, using GPS and a valet location, an address and time are determined. If recent or favorite, a valet is chosen and the address and time are determined. If an existing reservation then the address and time are determined.

Figure 5:
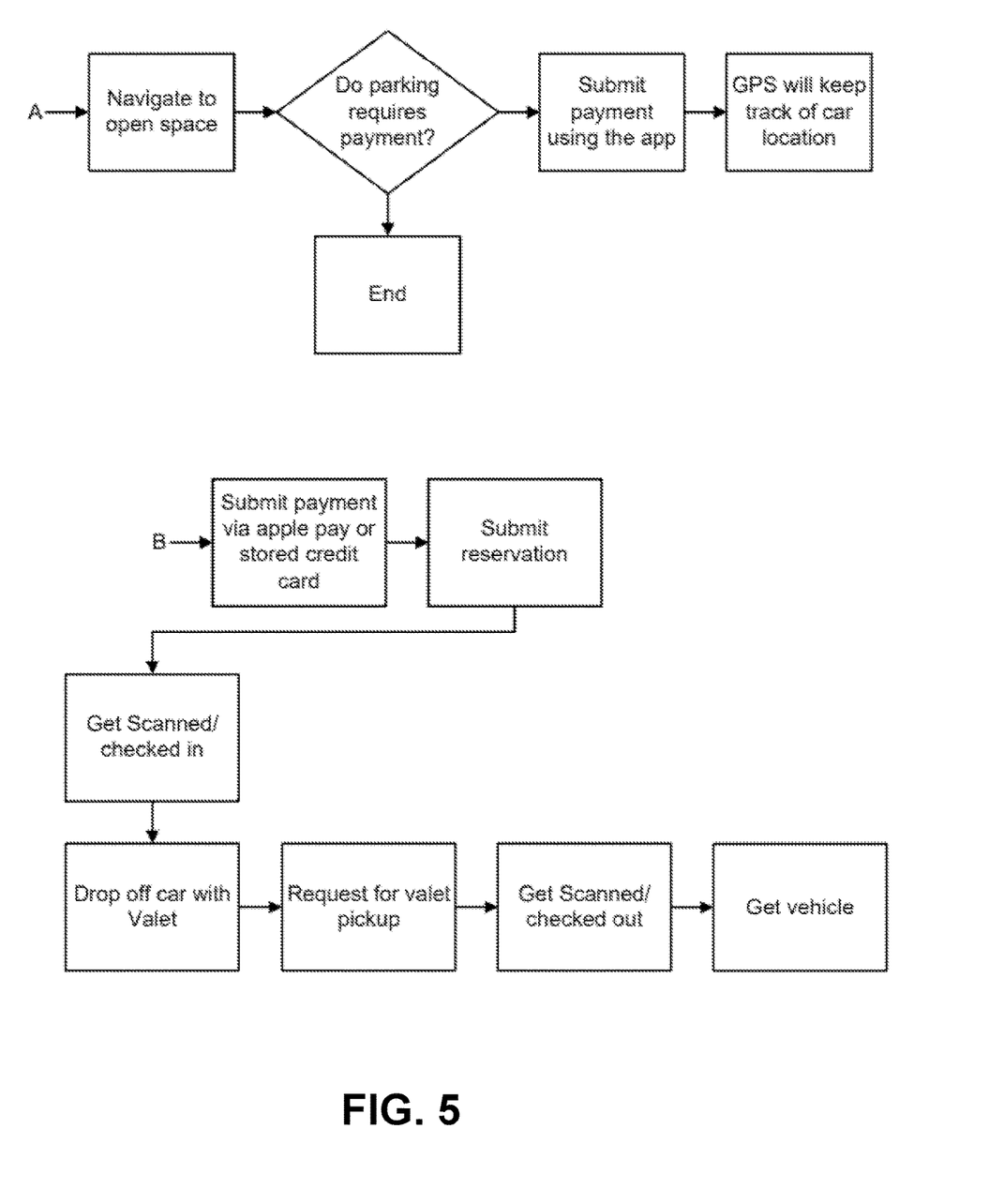
FIG. 5 depicts a third flow chart of state machine states of the multipark valet parking system in accordance with the present invention.

FIG. 5 depicts a third flow chart of state machine states of the multipark valet parking system in accordance with the present invention. Picking up from point A of FIG. 1, an open space is navigated and depending on if a parking payment is required, a payment is made via the app and GPS is set up to track the car location. Picking up from point B of FIG. 1, a payment is made and a reservation is submitted, scanned or checked in and the car is dropped off with the valet with a request for pickup, scan out and possession of the vehicle.

Figure 6:
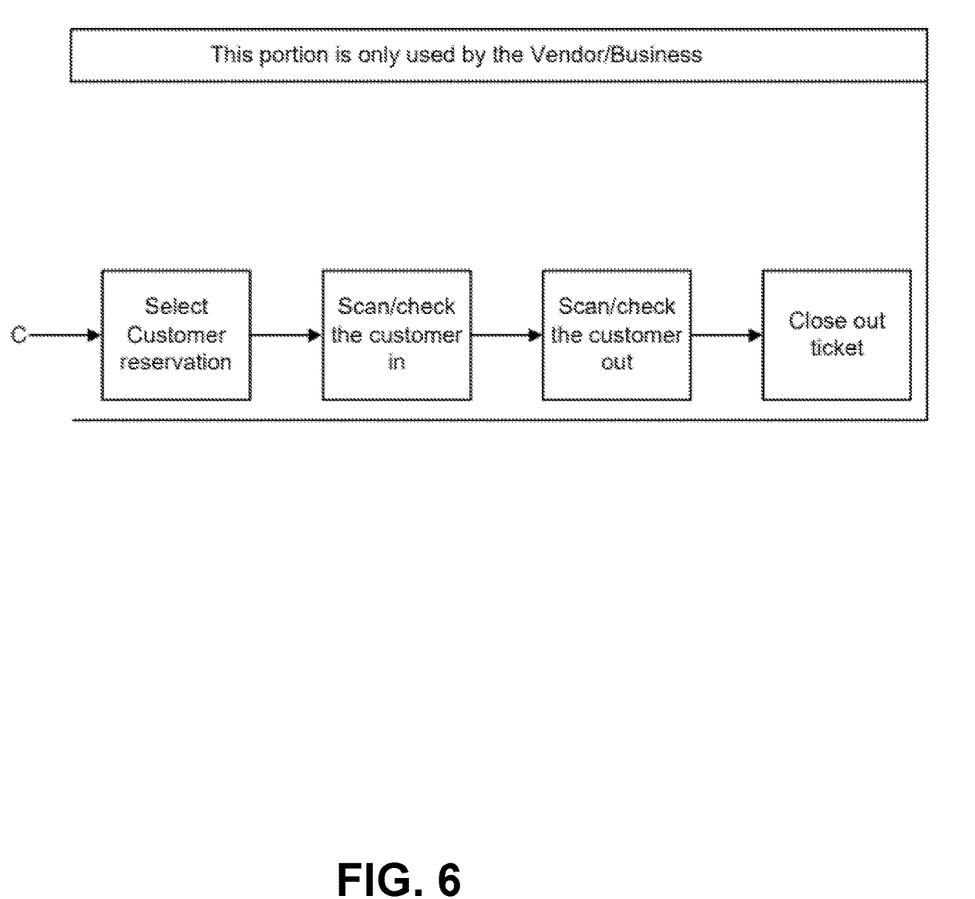
FIG. 6 depicts a fourth flow chart of state machine states of the multipark valet parking system in accordance with the present invention.

FIG. 6 depicts a fourth flow chart of state machine states of the multipark valet parking application in accordance with the present invention. Picking up from point A of FIG. 1, this flow chart is only used by the vendor or business. It includes selecting a customer reservation, a customer scan or check in, a customer scan or check out and closing the ticket.

Figure 7:
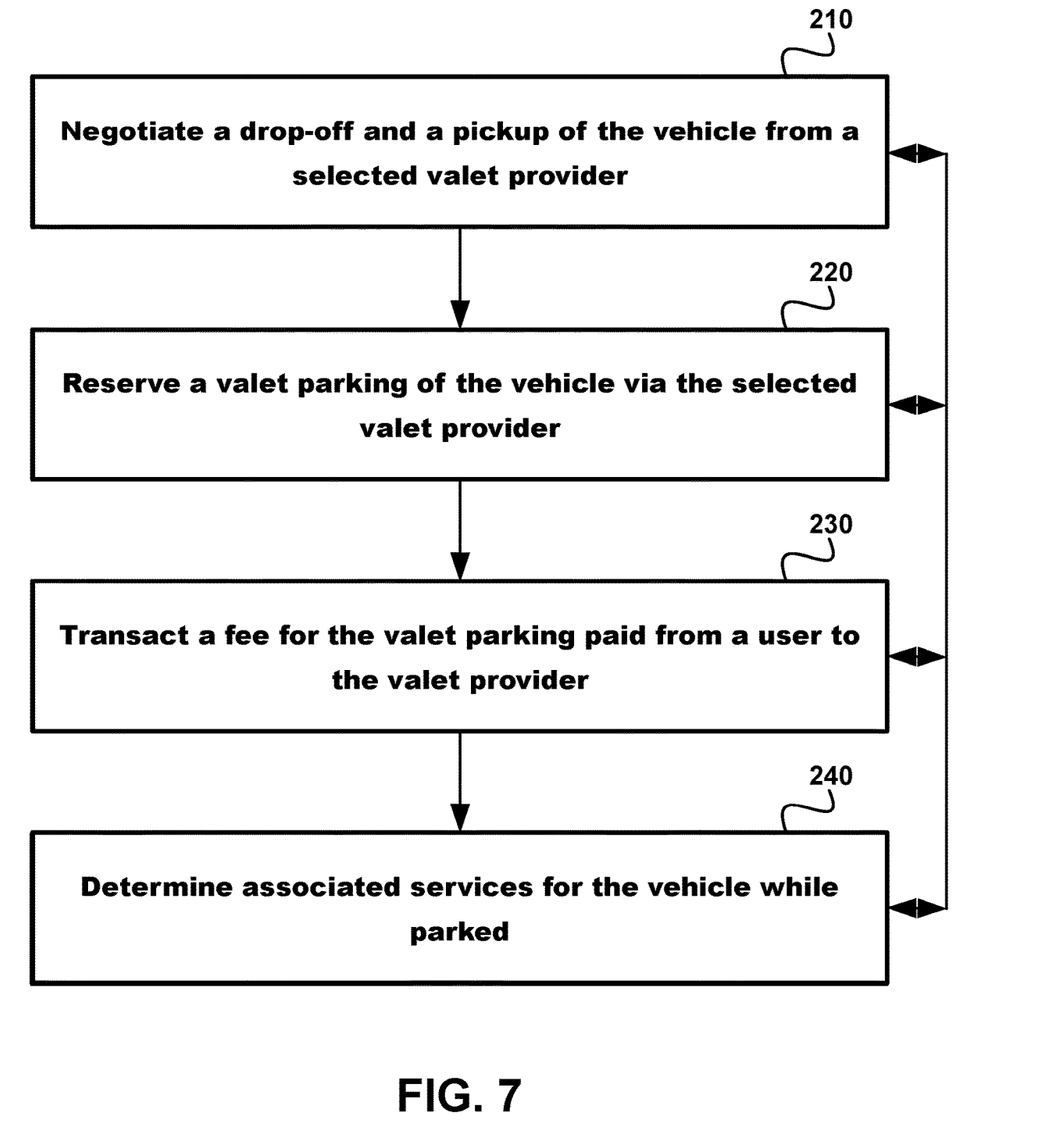
FIG. 7 is a fifth flow chart of state machine states for managing a valet parking of a vehicle per a multipark valet system in accordance with a present embodiment of the disclosure.

FIG. 7 is a fifth flow chart of state machine states steps of a valet parking of a vehicle per a multipark valet system in accordance with a present embodiment of the disclosure. The steps include negotiating state 210 a drop-off and a pickup of the vehicle from a selected valet provider, reserving state 220 a valet parking of the vehicle via the selected provider, transacting state 230 a fee for the valet parking paid from a user to the valet provider and determining state 240 associated services for the vehicle while parked.

Figure 8:
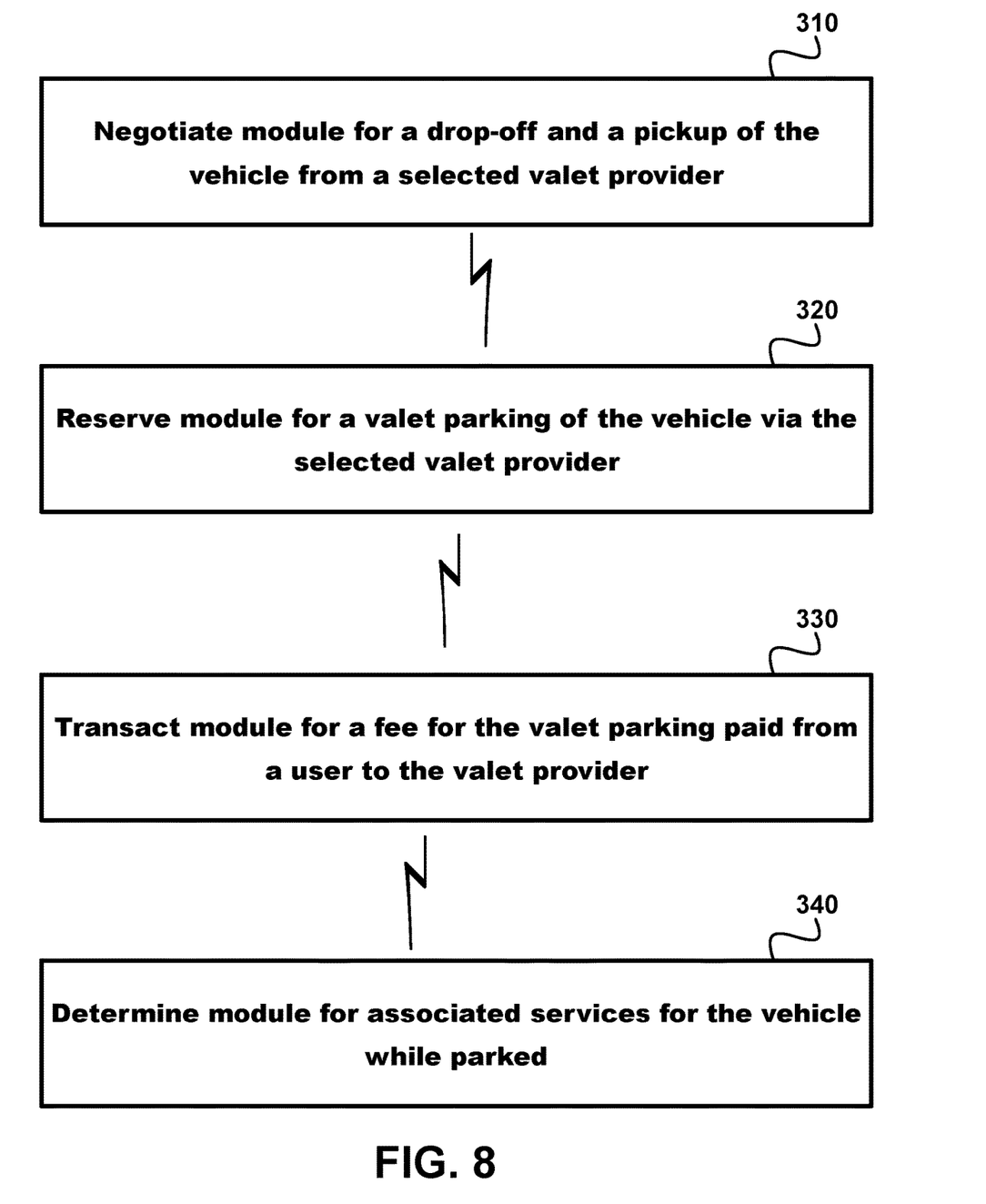
FIG. 8 is a block diagram of components of a vehicle via a multipark valet system in accordance with an embodiment of the present disclosure.

FIG. 8 is a block diagram of component modules for managing a valet parking of a vehicle per a multipark valet system in accordance with an embodiment of the present disclosure. The component modules include a negotiating state 310 configured for a drop-off and a pickup of the vehicle from a selected valet provider, a reserving state 320 configured for a valet parking of the vehicle via the selected provider, a transacting state 330 configured for a fee for the valet parking paid from a user to the valet provider and a determining state 340 configured for associated services for the vehicle while parked.

Therefore, the following is provided to a customer user: a name of a valet provider, a location of the provider, a total parking space available at the provider and space open to the user, price per hour parking, price for delayed bookings, distance to the provider and media ratings for the provider. The disclosed application also includes the ability of a user to extend their booking with the parking provider and to delay their booking. When a requested time is completed and a customer does not extend their booking, the disclosed application will show the status as delayed booking. When the customer user arrives to pickup their automobile, a button on the booking page will be displayed to 'complete booking,' and allow the customer user to pay all required fees without the assistance of human intervention. The customer user's automobile is released from the parking spot at the vendor's lot via an exit gate by electronic communications circuits.

An embodiment of the disclosure includes services on the vehicle to be performed by a third party while parked distal to the drop-off and the pickup time and location. The steps also include making a payment to the third party for the performance of the associated services distal to the drop-off and pickup time and location. The disclosure also includes a negotiating circuit module configured for a drop-off and a pickup time and location of the vehicle from a selected valet provider, a reserving circuit module configured for a valet parking of the vehicle via the selected provider, a transacting circuit module configured for a fee for the valet parking paid from a user to the valet provider and a determining circuit module configured for associated services for the vehicle to be performed by a third party while parked distal to the drop-off and pickup time and location. The component modules also include a payment circuit module configured for a payment to the third party for the performance of the associated services distal to the drop-off and pickup time and location.

The present invention has been shown and described in what is considered to be the most practical and preferred embodiment thereof. It is recognized, however, that departures may be made there from within the scope of the invention and that obvious modifications will occur to a person skilled in the art.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. A vehicle valet system comprising:
 a plurality of front, back and lateral RF (radio frequency) decals respectively disposed on the vehicle configured to provide a 360 degree overall RF coverage of the vehicle;
 a trigger of at least two of the RF decals via an encoded cell phone signal to verify an identification and a tracking of the vehicle; and
 an electronic circuit of a state machine decal configured to providing associated services for the vehicle while parked and a payment directly from a car owner to a service provider as a third party, wherein
 a state of the electronic state machine is configured to receive the vehicle a location distal from a location of the valet parking, and
 a state of the electronic state machine is configured to contract a mechanical repair to the vehicle to be parked.

2. The system of claim 1, wherein the front, the back and the lateral RF decals comprise an overlapping coverage of the vehicle.

3. The system of claim 1, wherein the front, the back and the lateral RF decals provide a 360 degree overlapping RF coverage of the vehicle.

4. The system of claim 1, further comprising a state of the electronic state machine configured to determine associated services for the vehicle while parked.

5. The system of claim 1, further comprising a state of the electronic state machine configured to reserve a new valet reservation via a GPS (global positioning satellite) location of the vehicle, a location of a selected valet provider and a drop-off and pickup time disclosure.

6. The system of claim 1, further comprising a state of the electronic state machine configured to reserve an existing valet reservation via modifying a drop-off and a pickup time.

7. The system of claim 1, further comprising a state of the electronic state machine configured to reserve a favorite valet provider reservation via a predetermined GPS location of the vehicle, a predetermined location of a favorite valet provider and a predetermined drop-off and pickup time.

8. The system of claim 1, further comprising a state of the electronic state machine configured to rent the vehicle to a third party for a time the vehicle is to be parked.

9. The system of claim 1, further comprising a QR (quick response) code sticker on the vehicle configured to be scanned with a mobile phone or police scanner to identify an owner of the vehicle.

10. The system of claim 1, further comprising a state of the electronic state machine configured to enable a pickup of the vehicle from a third party vehicle rental provider.

11. The system of claim 1, further comprising a state of the electronic state machine configured to a protocol for renting and servicing the vehicle while parked.

12. The system of claim 1, further comprising a state of the electronic state machine comprising a combinatorial NAND gate and an Inverter gate configured to at least two active high triggers of the RF decals via the encoded cell phone signal.

* * * * *